United States Patent [19]

Garcia

[11] 4,358,880
[45] Nov. 16, 1982

[54] QUICK RELEASE SNAP

[75] Inventor: Alexander Garcia, Berlin, Conn.

[73] Assignee: Gulf & Western Manufacturing Company, Southfield, Mich.

[21] Appl. No.: 165,738

[22] Filed: Jul. 3, 1980

[51] Int. Cl.³ .......................................... A44B 13/02
[52] U.S. Cl. ............................ 24/241 PS; 24/241 SL
[58] Field of Search .......... 24/241 PS, 241 SB, 241 S, 24/241 R, 241 PL, 241 PP, 241 SL, 241 SP, 230 AL

[56] References Cited

U.S. PATENT DOCUMENTS

| | | | |
|---|---|---|---|
| 29,029 | 7/1860 | Wynblad | 24/241 SL |
| 343,037 | 6/1886 | Klinkner | 24/241 SL |
| 855,368 | 5/1907 | Watson | 24/241 PS |
| 1,233,376 | 7/1917 | Link | 24/241 PS |
| 1,235,480 | 7/1917 | Johnson | 24/241 SP |
| 2,216,499 | 10/1940 | Ohotto | 24/241 SL |
| 4,152,814 | 5/1979 | Ito | 24/241 PS |

FOREIGN PATENT DOCUMENTS

| | | | |
|---|---|---|---|
| 999825 | 2/1952 | France | 24/241 SL |
| 1065231 | 4/1967 | United Kingdom | 24/241 PS |

OTHER PUBLICATIONS

North & Judd Catalog No. 264, A Gulf & Western Manufacturing Company.

Primary Examiner—Victor N. Sakran
Attorney, Agent, or Firm—Meyer, Tilberry & Body

[57] ABSTRACT

There is provided a quick release hardware snap of laminated construction formed from at least two stamped sheet material blanks, of mirror image, combined to provide a laminated, sheet material body of generally flat configuration having a fixed load supporting hook extending from the body with a free end and an open side with a latchable, locking finger coupled to the free end. The latchable finger is releaseably retainable at the body by a biased, locking sleeve reciprocally mounted about a tubular portion of the body. The locking sleeve is mounted so that a spring within the tubular portion of the body urges the locking sleeve toward the latchable finger for securing one end of the finger to the body, for closing the hook. The locking sleeve may be moved along the tubular portion of the body, against the biasing force to a position whereby the latchable locking finger is released for quick release of the load retained by the load supporting hook.

7 Claims, 3 Drawing Figures

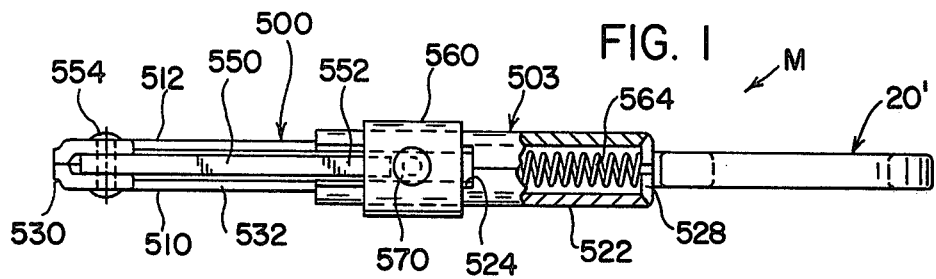
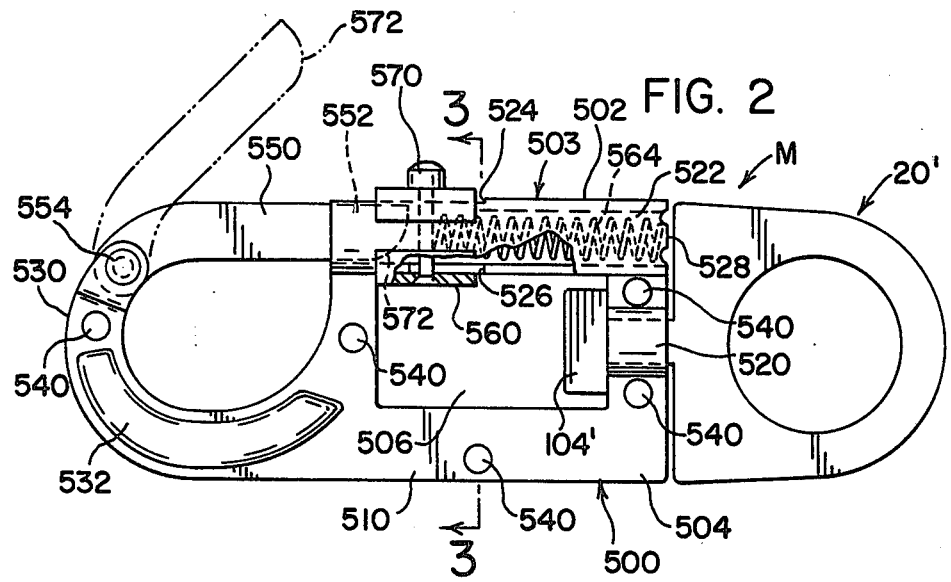
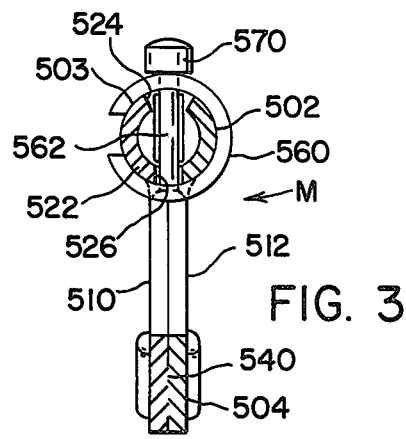

QUICK RELEASE SNAP

DISCLOSURE

This invention relates to the art of hardware fixtures and more particularly to an improved quick release snap which can be constructed with a generally flat, elongated, sheet material unitary body.

BACKGROUND OF INVENTION

The present specification incorporates, by reference, U.S. Patent Application Ser. No. 165,737, entitled An Improved Hardware Snap And Method of Producing Same, the inventor of the present invention being one of the joint inventors, both applications being filed on the same date and both applications assigned to the same assignee.

A quick release snap is a hardware fixture that can couple to a variety of elements, such as a rope or eyelet, onto a support structure by first coupling the fixed eye of the snap to the support structure then selectively opening the quick release portion of this snap and engaging whatever structure is to be supported, then closing the snap for retention of the structure. In the past, the opening arrangement of a quick release snap involved a hook portion mounted to the body of the snap with an unsupported free end. The unsupported free end of the hook defined an opening in the hook. The opening was normally closed by a biased latch or locking element pivotally coupled to the body so as to provide a normally closed, secure hook which was responsive to outside pressure to open the hook for quick release. The locking element, in its normal state, assumed a locking or closed hook position with respect to the free end of the hook to complete closure of the hook. However, the hook portion of the snap had a free end, entirely unsupported, even in a locked condition.

Another structure for a quick release snap involved a complex body element with a two piece, pivotally joined hook. One part of the hook was connected to one side of the body and its free end supported a pivotally joined second portion of the hook. The second portion of the hook formed part of the locking element of the hook but was subjected to the forces retained in the hook and because forces were applied to the moveable portion of the hook, the hook was subjected to potential damage and reduced maximum force capacity. To release this construction hook it was necessary to release the locking portion of the hook from its locked position while the snap was under load in certain instances. In more recent procedures it is usual to die cast all or part of the snap and in some instances, to use malleable metals.

THE INVENTION

The present invention relates to an improved hardware snap of the quick release type which overcomes the disadvantages of prior quick release snaps in that in its preferred form a generally flat sheet metal, unitary body of laminated construction is provided which can be easily manufactured by relatively simple metal stamping and uncomplicated assembly procedures and which includes a hook integral with the body to support the forces exerted on the locked snap. In addition, by providing a hook of both fixed and moveable construction with both parts coupled to hook the snap itself, the closing element of the quick release snap could be released even while the load is applied to the snap.

In accordance with the present invention there is provided a quick release snap of laminated construction comprising a generally flat, elongated, multi-sheet, metal body formed from two previously struck sheet metal blanks, and coupled to provide a laminated structure. The snap has a fixed load supporting hook with a free end and an open side, with a pre-formed elongated tubular portion in the body having an outer cylindrical surface with an open slot defining an entrance into the tubular portion for the free end of the hook. The hook is the same laminated structure as the body and is composed of a fixed portion, connected to the body with a free end and a locking portion pivotally coupled to the free end of the fixed portion and adapted to close the hook when in a locked position. A locking sleeve is reciprocally mounted about the outer cylindrical surface of the tubular portion and is biased so as to close the entrance slot in the tubular portion of the body by means of a spring internally mounted in the tubular portion. The locking portion, or locking finger of the hook is constructed with one end pivotally mounted onto the free end of the fixed hook and the other end cammed for automatically displacing the locking sleeve and adapted to pass through the slot forming the entrance to the tubular portion and there held captive within the tubular portion by the locking sleeve, when the locking sleeve is in its normal biased position. The locking finger pivots about an axis generally perpendicular to the body of the snap between an open position with the free end spaced from the tubular portion and a close position with the free end extending into the tubular portion of the body and held captive by the locking sleeve. The locking sleeve has a camming portion to be engaged by the cammed surface of the locking finger for forcing the sleeve against the spring as the finger is moved into the closed position. By constructing a quick release snap in accordance with this concept, the fixed hook has a free end extending back toward the body portion of the snap to form part of the curve of the hook. Since the body and fixed hook portions of the snap are made of laminated construction, the size relationship between the fixed portion of the hook and the locking or pivotal portion of the hook can be of any ratio desired. The laminated construction of the various parts of the snap provide a strong unit which can be strength-rated, is easily produced at a low cost and may be uniform in characteristics throughout an entire production run. In addition, the sheet material selected from which the blanks are stamped may be so selected so as to produce a quick release snap having the strength desired, within the limits of the strength and thickness of the material used. The locking portion of the hook may be a solid piece or a laminated piece but in either instance may be a stamped part. Additionally, the tubular portion can be easily formed from the sheet metal used in the manufacture of the body portion, by use of a stamping process, so that a relatively simple tubular element for supporting the moveable locking sleeve can be obtained. Assembly of the moving parts is a simple operation and the securing of the stamped parts to form the laminated, finished product may be done by welding, braising, riveting or any other method of securing two fitted parts together. Thus all cast formed parts may be eliminated.

The primary objective of the present invention is to provide a hardware snap of the quick release type which is economical to manufacture, uses sheet material components and provides a support hook that is fixed with respect to the body portion and does not form a part of the moveable member used in opening and closing the lockable hook.

These and other objects and advantages will become apparant from the following description taken together with the accompanying drawings.

BRIEF DESCRIPTION OF DRAWINGS

FIG. 1 is a side elevational view showing the preferred embodiment of the present invention;

FIG. 2 is a top plan view showing the embodiment of the invention illustrated in FIG. 1; and FIG. 3 is a cross-sectional view taken generally along line 3—3 of FIG. 2.

PREFERRED EMBODIMENT

Referring now to the drawings wherein the showings are for the purpose of illustrating a preferred embodiment of the invention only and not for the purpose of limiting same. FIGS. 1-3 show a quick release snap M constructed in accordance with the present invention. The snap M includes a unitary body 500 having spaced parallel legs 502, 504 defined by a central aperture 506. A sheet metal tubular barrel portion 503 is formed in leg 502 by forming half of this barrel in each of two generally flat, sheet metal blanks 510, 512 spot welded together to provide the elongated, laminated, unitary body 500. Snap M also includes swivel element or eyelet 20' having a head 104' which is supported at the right hand end of body portion 500, as shown in FIGS. 1 and 2. Head 104' is received within aperture 506 through an opening which allows eyelet 20' to swivel. Since blanks 510, 512 are substantially the same, only blank 510 will be described. This description will apply to blank 512. The blanks include a deformed area 520 which combine to form the swivel retaining tunnel of snap body 500. A half barrel 522 includes an upper slot 524, a lower slot 526 and a rearward spring stop or tab 528. A load supporting or fixed hook 530 is provided with an arcuately extending reinforcing rib 532 so that the two sheet metal parts of hook 530, when combined, form a fixed hook means for snap M. The free end of the hook faces the body portion to form a curve for support of an external element. Spot weld areas 540 secure blanks 510, 512 together to form unitary body 500. A lock finger 550 having a free end 552 is pivotally mounted onto the free end of hook 530, about an axis perpendicular to the side of the body 500 so that the finger may be manually pivoted between the closed position shown in solid lines in FIG. 2, and the opened position, shown in phantom lines in FIG. 2. To secure finger 550 in its closed position, a split ring or sleeve 560 is moved over end 552, as shown in FIG. 2. To accomplish this, split sleeve 560 is reciprocally mounted on barrel 503 and includes a support pin 562 extending through the barrel and through an upper and lower slot formed by slots 524, 526 of the individual sheet metal blanks 510, 512. The spring 564 supported in the barrel or tubular portion 503 is retained at its one end by tabs 528 and at its other end by pin 562 of the sleeve 560. The spring 564 is under some compression and therefore biases sleeve 560 via pressure on pin 562, to its most forward position, covering the upper part of slot 524. In this position sleeve 560 prevents passage of finger 550 through slot 524. When the end portion 552 of finger 550 is in the barrel 503, the sleeve 560, in its upper position, covers the end portion 552, locking the finger 550 in the barrel 503 and slot 524 effectively closing the hook of the quick release snap. For quick release of the hook, i.e. open the snap M, knob 570, supported on pin 562, is forced to depress spring 564 as shown in FIG. 2 and move the sleeve 560 so as to uncover the normally covered part of the slot 524 thereby permitting passage through the slot 524, effectively releasing the finger 550 from its captive position in the barrel 503 and opening the hook of the snap M.

For automatic closure, finger 550 includes thereon a cam surface 572 which cams sleeve 560 to a depressed position as finger 550 moves into a closed position. In this manner, a relatively simplified, laminated quick release snap is provided having uniform, predetermined characteristics, with a pivoted locking finger that does not normally support applied forces.

Having thus defined the invention, the following is claimed:

1. An hardware snap of the quick release type comprising:

a generally flat, elongated, sheet metal body having a fixed load supporting hook with a free end and an open side;

means forming an elongated tubular sheet metal portion on said body with an outer cylindrical surface and an end facing generally toward said free end of said hook;

said fixed hook extending radially and axially of said tubular portion and having a load bearing portion preceding said free end in the direction of extension;

a locking sleeve reciprocally mounted onto said outer cylindrical surface;

spring means in said tubular portion for biasing said sleeve toward said end of said tubular portion and, thus toward said free end of said hook;

a locking finger with first and second ends and having a cam surface at said first end;

means for pivotally mounting said finger by said second end on said free end of said hook and about an axis generally perpendicular to said flat body, said locking finger movable between an open position with said first end spaced from said tubular portion and a closed position with said first end in said tubular portion and, said sleeve having a camming portion to be engaged by said cam surface for forcing said sleeve away from said finger and against said spring means as said finger is moved into said closed position.

2. An hardware snap of the quick release type comprising:

a generally flat, elongated, sheet metal body having a fixed load supporting hook with a free end and an open side;

means forming an elongated tubular sheet metal portion on said body with an outer cylindrical surface and an end facing generally toward said free end of said hook;

a locking sleeve reciprocally mounted onto said outer cylindrical surface;

spring means in said tubular portion for biasing said sleeve toward said end of said tubular portion and, thus toward said free end of said hook;

a locking finger with first and second ends and having a cam surface at said first end;

means for pivotally mounting said finger by said second end on said free end of said hook and about an axis generally perpendicular to said flat body, said locking finger movable between an open position with said first end spaced from said tubular portion and a closed position with said first end in said tubular portion;

said sleeve having a camming portion to be engaged by said cam surface for forcing said sleeve away from said finger and against said spring means as said finger is moved into said closed position;

said elongated sheet metal body including a second side opposite and parallel with the side formed by said tubular portion and a second end opposite the end formed by the fixed load supporting hook, said two sides and two ends defining an aperture in said body, said second end having an opening, said opening defining a barrel portion, open at both ends and opening into said aperture and, a swivel element having a body, a neck and a head, said body supporting a hole defining an eye, said neck connecting said head and said body, said neck being of sufficient size and length to float freely in said barrel and said head being sufficiently small to float freely in said aperture but sufficiently large so as not to pass through said barrel, said neck positioned in said barrel with said head in said aperture for forming a swivel eye at said second end of said snap.

3. An hardware snap of the quick release type comprising:
- a two piece body having a load supporting hook forming one end of said body with a fixed hook extending from said body and having a free end, said load supporting hook having an open side;
- each piece of said two piece body being contoured and fitted together for forming a first side and a second side said first side and said second side being substantially parallel to each other, with said first side extending into said fixed hook and said second side forming an elongated tubular portion with an outer cylindrical surface;
- a slot extending along part of said tubular portion and opposite said first side;
- a spring secured in said tubular portion and providing a biasing force;
- a locking sleeve reciprocally mounted about said outer cylindrical surface and biased by said spring for covering at least part of said slot;
- an hook closure finger coupled to the free end of said fixed hook and extending at least into said slot for closing said open side when said hook closure finger is positioned in said slot;
- means for pivotally mounting said hook closure finger to said free end of said fixed hook for permitting said finger to move between a closed position and an open position, and
- a cam surface at the other end of said hook closure finger for contacting said locking sleeve in its travel from an open position toward the closed position for sliding said locking sleeve along the outer cylindrical surface of said tubular portion against the spring bias for providing access to said slot for the said other end of said finger, said locking sleeve returning to its biased position after said hook closure finger enters said slot for retaining said hook closure finger within said slot for closing said load supporting hook and locking said snap.

4. An hardware snap of the quick release type as defined in claim 3 and in which said two piece body includes a second end opposite said one end said second end connecting said first side and said second side,
- said one end and said second end, and said first side and said second side defining an aperture in said body,
- each piece of said two piece body being separated at said second end said separation defining a barrel open at both ends and communicating with said aperture, and said snap also includes;
- an eye swivel having a body, a neck and a head, said body supporting an aperture defining the eye of said eye swivel, said neck connecting said head and said body, said neck being longer than the length of said barrel and having an outside diameter shorter than the inside diameter of said barrel, for permitting said neck to freely float in said barrel, said head being shorter in length and width than the corresponding length and width of said aperture but longer in width than the said inside diameter of said barrel for permitting said head to float freely in said aperture and for preventing said head from passing through said barrel, said eye swivel positioned with said neck in said barrel and said head in said aperture for retaining said swivel eye at said second end of said snap.

5. An hardware snap of the quick release type as defined in claim 3 and further including:
- means coupled to said locking sleeve for urging said sleeve against the biasing force of said spring in response to application of pressure thereon for moving said sleeve along said outer cylindrical surface for uncovering said slot and releasing said hook closure finger when said load supporting hook is closed.

6. A snap swivel of the quick release type comprising:
- a generally rectangular, multi-layer sheet metal body having a multi-part load supporting hook at one end and a swivel mounted eye at the other end;
- a first part of said multi-part load supporting hook extending from a first side of said body in an arc beyond said one end and terminating in a free end substantially short of said one end at the side opposite said first side defining an opening in said multi-part load supporting hook;
- a tubular portion formed by a rounded separation of at least two parts of said multi-layer sheet metal body extending along at least part of the length of said side opposite said first side;
- a slot in said tubular portion and extending along part of the length of said tubular portion;
- a sleeve mounted for reciprocal travel along the outer surface of said tubular portion and for covering at least part of said slot;
- means for urging said sleeve in a first direction of travel along the outer surface of said tubular portion for covering at least an end portion of said slot to prevent passage through said slot;
- a second part of said multi-part load supporting hook having a first end pivotally coupled to said free end of said first part and said second part extending from said first end to a second end providing sufficient length for a portion of said second part adjacent its said second end to enter said tubular portion through said slot for closing the opening in said multi-part load supporting hook and, means coupled to said sleeve for moving said sleeve in a second direction in response to application of pressure on said means for uncovering said end portion of said slot for permitting a part of said second part adjacent the said second end of said second part to pass through said slot and enter or leave said tubular portion.

7. A snap swivel of the quick release type as defined in claim 6 and in which said one end and said other end are spaced from each other and said first side and said side opposite said first side are spaced from each other for defining an aperture in said multi-layer sheet metal body and;

at least two sheets of said multi-layer sheet body forming said other end are separated for providing a tunnel communicating with said aperture and;

said swivel mounted eye includes a body, a neck and a head, said body containing a hole defining an eye, said neck connecting said body and said head, said neck being longer than the length of said tunnel and shorter in diameter than the inside diameter of said tunnel, said head being smaller in length and width than the corresponding length and width of said aperture but larger in width than the inside diameter of said tunnel and said swivel mounted eye is mounted with said neck positioned in said tunnel and said head in said aperture.

* * * * *